Sept. 9, 1924.

J. SCHLATTER

VEHICLE WHEEL

Filed Feb. 26, 1923

1,508,301

John Schlatter,
INVENTOR

BY Victor J. Evans
ATTORNEY

WITNESS:

UNITED STATES PATENT OFFICE.

JOHN SCHLATTER, OF ROCHELLE PARK, NEW JERSEY.

VEHICLE WHEEL.

Application filed February 26, 1923. Serial No. 621,313.

*To all whom it may concern:*

Be it known that I, JOHN SCHLATTER, a citizen of United States, residing at Rochelle Park, in the county of Bergen and State of New Jersey, have invented new and useful Improvements in Vehicle Wheels, of which the following is a specification.

This invention relates to improvements in vehicle wheels.

The principal object of the invention is the construction of a wheel capable of absorbing all shocks and jars, and wherein all possibilities of a blow-out are eliminated. It will therefore be understood that the custom of carrying spare tires will be disposed of.

Another object of the invention is the provision of a vehicle wheel having a plurality of cushioning members arranged about the periphery of the felly, the same being easily removed should it be desired to replace any or all of the members.

A further object of the invention resides in the provision of a wheel which is simple in construction, cheap of manufacture, and consisting of relatively few parts.

With these and other objects in view the invention resides in the certain novel construction, combination and arrangement of parts, the essential features of which are hereinafter fully described in the specification, are pointed out in the appended claims, and illustrated in the accompanying drawing, in which:

Figure 1:
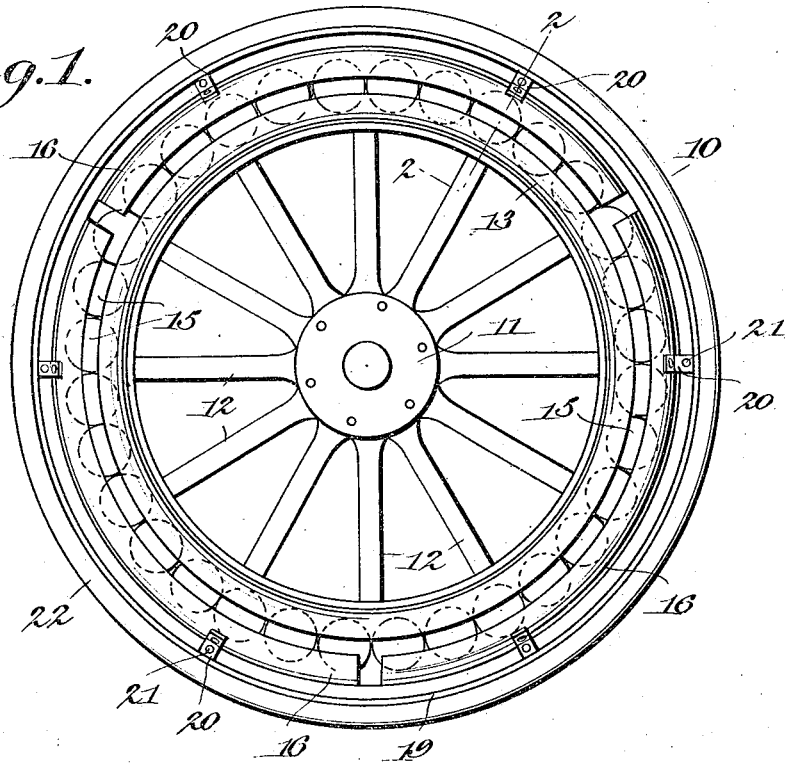
Figure 1 is a side elevation of my improved vehicle wheel.
Figure 2:
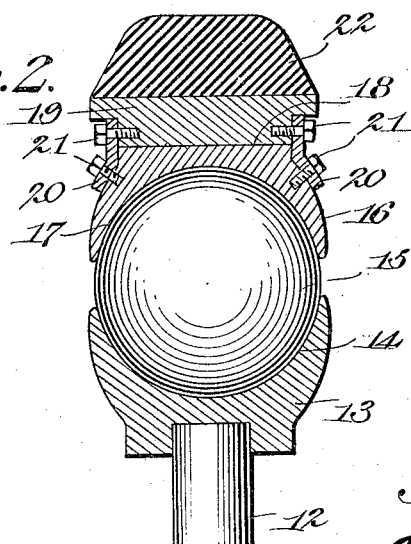
Figure 2 is an enlarged vertical sectional view therethrough taken on the line 2—2 of Figure 1.

Referring more particularly to the drawing the reference character 10, designates my improved vehicle wheel in its entirety, having the usual hub 11 and spokes 12. The spokes 12 have their outer ends secured to a felly 13 made of any suitable material the same being provided with an annular channel 14. The channel 14 is semi-circular in cross-section for the reception of a plurality of cushioning elements 15. These cushion elements are shown as rubber balls arranged circumferentially about the felly 13 and are held in the channel 14 by means of a plurality of segments 16, which segments have channels 17 similar in cross-section to the channel 14 of the felly both of which are concave. It will be seen that the channels 14 and 17 are so curved in cross-section as to permit the cushion members 15 to fit snugly therein. The outer periphery of the segments are provided with flat surfaces 18 adapted to receive an annular metal ring 19. The parts 16 and 19 are connected by means of retaining devices 20, through which pass fastening elements 21 such as screws or the like. By this arrangement the segments 16 are held in their proper position and are prevented from creeping with relation to the ring 19. The ring 19 carries a rubber thread 22 of any well-known construction.

From the foregoing it will be manifest that there has been shown and described a wheel construction capable of producing the result now obtained by the use of pneumatic tires which are subject to punctures and are very troublesome to apply or remove from the rim of a wheel. My device eliminates these objections for should it be desired to remove one of the cushioning members 15 for any reason, the same may be accomplished by removing the retaining devices 20 of the particular segment and removing that segment. This can be done with little difficulty and in the minimum amount of time.

While there has been shown and described what I consider to be the preferred form of my invention I wish it to be understood that changes, alteration and modifications as come within the claims may be resorted to when desired.

What is claimed as new is:—

1. In a vehicle wheel, the combination with a felly having a continuous semi-circular groove therein, a rim, a tread surface formed on said rim, a plurality of segmental sections each having a semi-circular groove therein extending the length of the same, spherical cushioning members interposed between said felly and said segmental sections and seated in the semi-circular grooves of the same, and means for removably securing said segmental sections to said rim, 2. In a vehicle wheel, the combination with a felly having a continuous semi-circular groove therein, a rim, a tread surface formed on said rim, a plurality of segmental sections each having a semi-circular groove therein extending the length of the same, spherical cushioning members interposed between said felly and said segmental sections and seated in the semi-circular grooves of the same, and lugs removably secured to said rim and said segmental sections.

In testimony whereof I hereby affix my signature.

JOHN SCHLATTER.